(12) United States Patent
Tiwary

(10) Patent No.: US 12,301,658 B2
(45) Date of Patent: May 13, 2025

(54) NETWORK VIRTUALIZATION FOR WEB APPLICATION TRAFFIC FLOWS

(71) Applicant: SAP SE, Walldorf (DE)

(72) Inventor: Mayank Tiwary, Odisha Rourkela (IN)

(73) Assignee: SAP SE, Walldorf (DE)

(*) Notice: Subject to any disclaimer, the term of this patent is extended or adjusted under 35 U.S.C. 154(b) by 264 days.

(21) Appl. No.: 16/165,569

(22) Filed: Oct. 19, 2018

(65) Prior Publication Data

US 2020/0125664 A1    Apr. 23, 2020

(51) Int. Cl.
| | |
|---|---|
| G06F 16/00 | (2019.01) |
| G06F 9/455 | (2018.01) |
| G06F 16/2453 | (2019.01) |
| G06F 16/27 | (2019.01) |
| G06F 16/951 | (2019.01) |
| H04L 41/08 | (2022.01) |
| H04L 67/1097 | (2022.01) |
| H04L 43/20 | (2022.01) |
| H04L 67/02 | (2022.01) |

(52) U.S. Cl.
CPC ...... *H04L 67/1097* (2013.01); *G06F 9/45558* (2013.01); *G06F 16/24549* (2019.01); *G06F 16/27* (2019.01); *G06F 16/951* (2019.01); *H04L 41/08* (2013.01); *G06F 2009/45595* (2013.01); *H04L 43/20* (2022.05); *H04L 67/02* (2013.01)

(58) Field of Classification Search
CPC .... G06F 16/27; G06F 16/951; G06F 9/45558; G06F 2009/45595; G06F 16/24549; G06F 2009/4557; H04L 41/08; H04L 43/20; H04L 67/02; H04L 69/22; H04L 67/1097; H04L 43/0817
See application file for complete search history.

(56) References Cited

U.S. PATENT DOCUMENTS

| | | | | |
|---|---|---|---|---|
| 10,614,066 | B2 * | 4/2020 | Gawande | G06F 16/282 |
| 10,970,340 | B2 * | 4/2021 | Tiwary | H04L 41/22 |
| 11,294,941 | B1 * | 4/2022 | Sammer | G06F 9/542 |
| 2003/0158842 | A1 * | 8/2003 | Levy | G06F 16/24532 |
| 2012/0166277 | A1 * | 6/2012 | Gnanamani | G06Q 30/02 |
| | | | | 705/14.49 |
| 2013/0058341 | A1 * | 3/2013 | Fulton | H04L 47/783 |
| | | | | 370/392 |

(Continued)

*Primary Examiner* — Dinku W Gebresenbet
(74) *Attorney, Agent, or Firm* — SCHWEGMAN LUNDBERG & WOESSNER, P.A.

(57) ABSTRACT

Various examples are directed to systems and methods for managing network traffic between a user query machine and a database query machine. A data center network controller may generate a plurality of query type scores describing database query type types directable from the user query machine to the database query machine. The data center network controller may generate a first database element score for a first database element. The first database element score may be based at least in part on a set of the query type scores associated with database queries to be executed at the first database element and on a first schema weight of a first schema associated with the first database element. The data center network controller may assign a first database element traffic flow to a first network appliance queue based at least in part on the first database element score.

24 Claims, 11 Drawing Sheets

(56) References Cited

U.S. PATENT DOCUMENTS

| | | | |
|---|---|---|---|
| 2013/0212148 A1* | 8/2013 | Koponen | H04L 47/10 709/201 |
| 2014/0330806 A1* | 11/2014 | Cui | G06F 16/951 707/706 |
| 2016/0080212 A1* | 3/2016 | Ramachandran | H04L 45/306 370/338 |
| 2016/0080230 A1* | 3/2016 | Anand | G06F 17/18 709/224 |
| 2016/0246841 A1* | 8/2016 | Pesala | G06F 16/2365 |
| 2016/0255542 A1* | 9/2016 | Hughes | H04W 28/18 370/329 |
| 2016/0308785 A1* | 10/2016 | Padmanabhan | H04L 47/10 |
| 2017/0366395 A1* | 12/2017 | Goldfarb | H04L 67/01 |
| 2018/0063178 A1* | 3/2018 | Jadhav | H04L 45/74 |
| 2018/0336198 A1* | 11/2018 | Zhong | G06F 16/24522 |
| 2018/0351820 A1* | 12/2018 | Nagarajan | H04L 41/5003 |
| 2019/0095241 A1* | 3/2019 | Ago | G06F 16/24573 |
| 2020/0073987 A1* | 3/2020 | Perumala | G06F 16/24545 |

\* cited by examiner

NETWORK VIRTUALIZATION FOR WEB APPLICATION TRAFFIC FLOWS

TECHNICAL FIELD

This document generally relates to methods and systems for use with computer devices, including networked computing devices. More particularly, this document relates to systems and methods for utilizing network virtualization in a web application environment.

BACKGROUND

Network virtualization is used to increase the configurability of network appliances, such as routers, switches, etc., that make up a computing network. Control plane components, such as various network controllers, often implemented in software, provide instructions to data plane components, such as hardware network appliances. The instructions provide the network appliances with rules for treating dataflows that include incoming packets.

BRIEF DESCRIPTION OF DRAWINGS

The present disclosure is illustrated by way of example and not limitation in the following figures.

DETAILED DESCRIPTION

Figure 1:
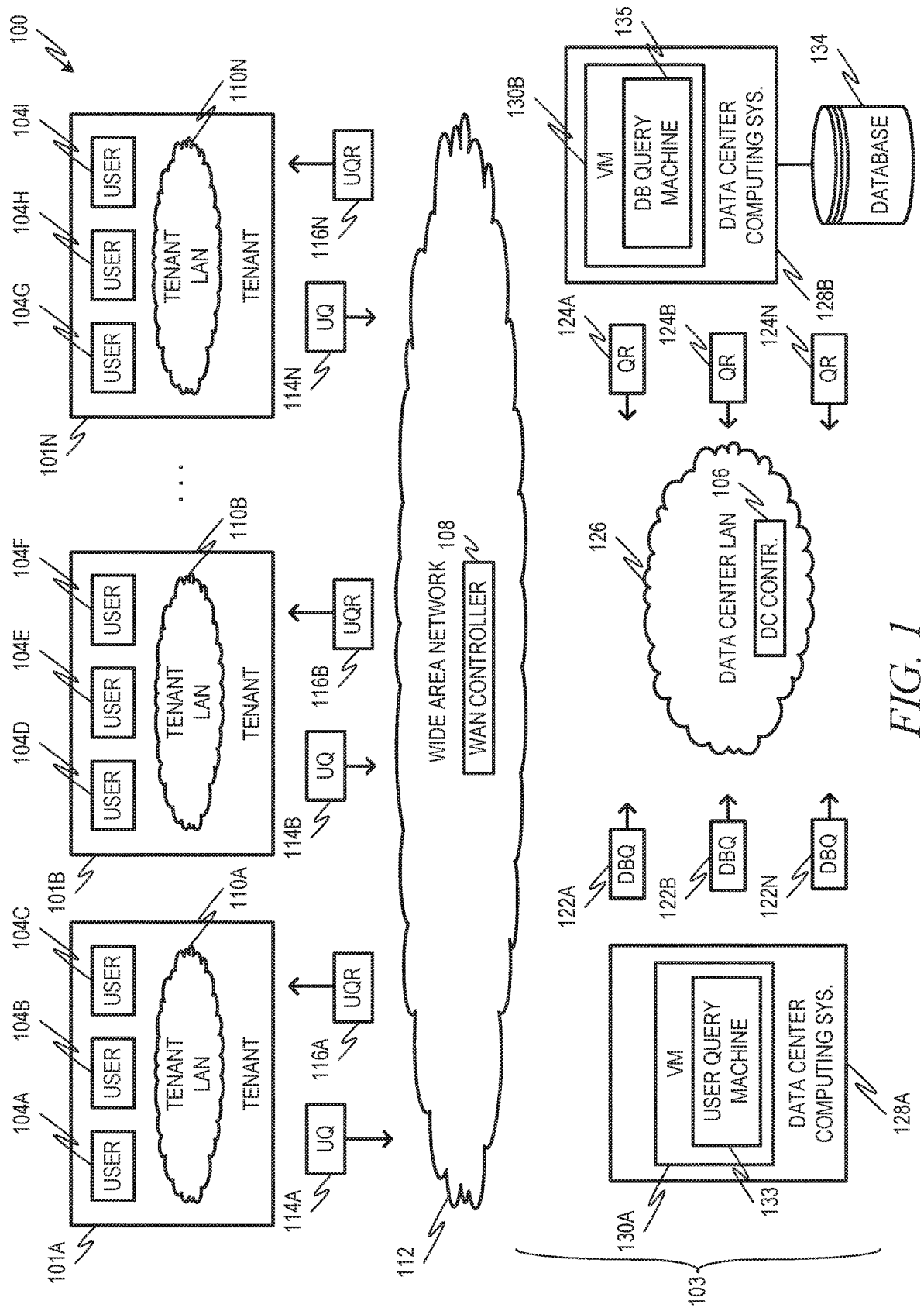
FIG. 1 is a diagram showing one example of an environment for implementing virtualization for web application queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for implementing multi-tenant network virtualization in a web application environment. In a web application environment, a web application executes at a web application system, which may include various physical or virtual machines. A user of the web application accesses the web application, for example, through a web browser executing at a user computing device. The user, through the web browser, sends a user query to the web application requesting that the web application perform a particular processing task. A user may have a set of user queries that the user is permitted to make of the web application. User queries are provided to the web application system.

Consider an example in which the web application environment includes Business One Cloud suite of applications available from SAP SE of Waldorf, Germany and the web application is an Enterprise Resource Planning (ERP) application. A particular user may be permitted to execute a set of user queries that return specific ERP-related information such as, for example, a request to view a purchase order, a request to view an inventory status, a request to add an invoice to an invoice record, etc.

In various examples, users of the web application are associated with different tenants. Tenants include businesses or other organizations that utilize the web application. Users associated with a particular tenant may be permitted to execute user queries associated with that tenant. Users associated with a tenant may include employees of the tenant, contractors of the tenant, or other similar individuals. Consider an example arrangement in which a tenant business utilizes an ERP web application to manage its accounts receivable. Users associated with the tenant are permitted to send queries to the ERP web application, for example, to enter accounts receivable for the tenant business, to check the status of certain accounts receivable to the tenant business, etc. ERP and other types of web applications may respond to queries of this type and other types, for example, depending on the particular implementation.

The web application system responds to user queries by performing the requested processing task. For example, the web application system can include one or more databases, a user query machine, and a database query machine. The user query machine receives user queries and translates the user queries into one or more database queries to be executed by a database query machine. Database queries can be organized into a format and/or syntax of a database, such as Structured Query Language (SQL) or another suitable database-related syntax. Returning to the ERP example, a user query to view a particular purchase order can be translated into a first SQL query to a user-permission table to determine whether the user is authorized to view the purchase order and a second SQL query directed to a table or other database element that includes entries corresponding to purchase orders associated with the user.

The user query machine sends the database query or queries to a database query machine that executes the database queries at the database. The database query machine provides database query replies to the user query machine. The user query machine prepares a response to the user query based on the database query reply or replies and provides the user query response to the user who made the initial user query.

At the web application system, the database can include different schemas for different tenants. A tenant-specific schema can include one or more database elements, such as tables, views, records, etc., that are specific to a particular tenant. Returning to the accounts receivable example, a first schema for a first tenant can include a first table including entries that describe customers of the first tenant and a second table including entries describing accounts receivable associated with the customers of the first tenant. User queries from users associated with the first tenant are processed by accessing the tables and/or other database elements of the first schema. A second schema for a second entity can have similar tables that are accessed to process user queries from users associated with a second tenant, and so on.

Arranging a web application to utilize a user query machine and database query machine, as described herein, can provide advantages related to the operation of the web application. For example, users may be able to make user queries without specific knowledge of the database or the corresponding schema. Also, separating the functions of generating database queries (at the user query machine) and executing database queries (at the database query machine) can allow the respective machines to be optimized for their specific purposes.

Separating the user query machine and the database query machine, however, creates additional challenges related to network traffic management. For example, network-related delays between the user query machine and database query machine increase the time that it takes the web application to respond to user queries.

The challenge of network management between the user query machine and the database query machine is increased for web applications with transitory usage. For example, not all users of the web application are active at any given time. Also, user permissions can change over time. A user that is not permitted to make a particular user query at one time may later be permitted to make that user query. As a result, the number and mix of user queries directed to a web application often changes over time. This means that static network configurations may not always operate at an acceptable level of efficiency. A static network configuration between the user query machine and the database query machine can lead to inefficient network performance as the mix of database queries from different tenants of the web application changes.

Various examples described herein address these and other challenges by implementing network virtualization between the user query machine and the database query machine to allow one or more of the networks traversed by user queries to be configured based on how the web application is being queried at any particular time. This may increase the network efficiency of the networks for the web applications, thereby resulting in increased speed and efficiency for the web application.

In various examples, a data center network controller configures network appliances at a data center network to optimize network traffic between the user query machine and the database query machine. The data center network controller may generate scores for different types of database queries that can be directed from the user query machine to the database query machine. The scores can be based response time for executing the database queries at the database.

The data center network controller assigns database queries to different network appliance queues based on the generated scores. In some examples, the assignment of queries to network appliance queues is also based on a particular tenant, or schema associated with a tenant. In this way, network connections between the user query machine and the database query machine can be efficiently used, increasing the speed and efficiency of the web application.

FIG. 1 is a diagram showing one example of an environment 100 for implementing virtualization for web application queries. The example shown in FIG. 1 includes tenants 101A, 101B, 101N, a wide area network (WAN) 112 and a web application system 103. Although three tenants 101A, 101B, 101N are shown, the environment 100 can include more or fewer tenants. Tenants 101A, 101B, 101N include respective user computing devices 104A, 104B, 104C, 104D, 104E, 104F, 104G, 104H, 104I. The user computing devices 104A-I may be or include any suitable type of computing devices including, for example, laptop computers, desktop computers, tablet computers, mobile computing devices, etc. Although three user computing devices 104A-I are shown at each tenant 101A, 101B, 101N, tenants may have any suitable number of user computing devices 104A-I.

Users can utilize the user computing devices 104A-I to receive user queries 114A, 114B, 114N and provide the user queries 114A, 114B, 114N to the web application system 103 for processing. User queries 114A, 114B, 114N are provided to the web application system 103 (e.g., a user query machine 133 thereof). For a given user query message 114A, 114B, 114N, the user query machine 133 generates one or more database queries 122A, 122B, 122N. Database queries 122A, 122B, 122N are provided to a database query machine 135 that executes the database queries 122A, 122B, 122N at a database 135. The database query machine executes the database queries 122A, 122B, 122N and provides database query responses 124A, 124B, 124N to the user query machine 133. The user query machine 133 uses the database query responses 124A, 124B, 124N to generate user query responses 116A, 116B, 116N, which are provided to the users who made the initial user queries 114A, 114B, 114N.

Consider an example user query 114A made by a user 104A of the tenant 101A. The user query 114A may be generated in response to user input by a front end query processor executing at the user's computing device 104A. The front end query processor can be or include a script or other interpreted language instructions executed through a web browser at the user computing device 104A. The user query 114A is provided to the user query machine 133 of the web application system 103. The user query machine 133 generates one or more database queries 122A, 122B, 122N relevant to the user query 114A. The database queries 122A, 122B, 122N are provided to the database query machine 135. The database query machine 135 executes the database queries 122A, 122B, 122N at the database 134 and provides one or more database query responses 124A, 124B, 124N. Based on the database query responses 124A, 124B, 124N, the user query machine 133 generates a user query response 116A. The user query response 116A is provided to the originating user 104A.

In the example of FIG. 1, the user query machine 133 and database query machine 135 are executed at respective virtual machines (VMs) 130A, 130B. VMs 130A, 130B are executed at respective data center computing systems 128A, 128B. In some examples, the user query machine 133 and/or database query machine 135 can be executed at physical machine (e.g., directly on one or more of the data center computing systems 128A, 128B). Data center computing devices 128A, 128B may be or include servers or other suitable computing devices. Data center computing devices 128A, 128B may be positioned at a single geographic location or across multiple geographic locations. Although the VM 130A associated with the user query machine 133 and the VM 130B associated with the database query machine are executed on different data center computing devices 128A, 128B, in some examples, the VMs 130A, 130B can be executed at the same computing device.

The database 134 can store web application data according to different schemas. A schema can include various database elements. A database element can be a table, a view, or similar subdivision of data stored at the database 134. Schemas at the database 134 can be specific to particular tenants 101A, 101B, 101N. For example, the tenant 101A can have an associated schema including one or more database elements that store data related to that tenant. When a user 104A, 104B, 104C associated with the tenant 101A makes a user query 114A, 114B, 114N, the web application system 103 responds to the user query, at least in part, with data from the schema associated with the tenant 101A.

Between the user computing devices 104A-I and the web application system 103, user queries 114A, 114B, 114N are communicated by several networks including, for example, tenant networks 110A, 110B, 110N, a WAN 112, and a data center network 126 associated with the web application system 103. Tenant networks 110A, 110B, 110N may be local area networks (LANs) Tenant networks 110A, 101B, 110N may be implemented by the tenants 101A 101B, 101N. For example, for a tenant 101A, 101B, 101N that is an organization, such as a business, a tenant network 110A, 110B, 110N may be or include an internal network of the organization. The WAN 112 carries communications between the respective tenants 101A, 101B, 101N and the web application system 103. The WAN 112 may include the Internet. In some examples, the WAN 112 also includes network components implemented by an Internet Service Provider (ISP) or other intermediate connection between the tenant networks 110A, 110B, 110N and the Internet. User query messages 114 may pass through the WAN 112 to a data center network 126 implemented at the web application system 103.

Figure 2:
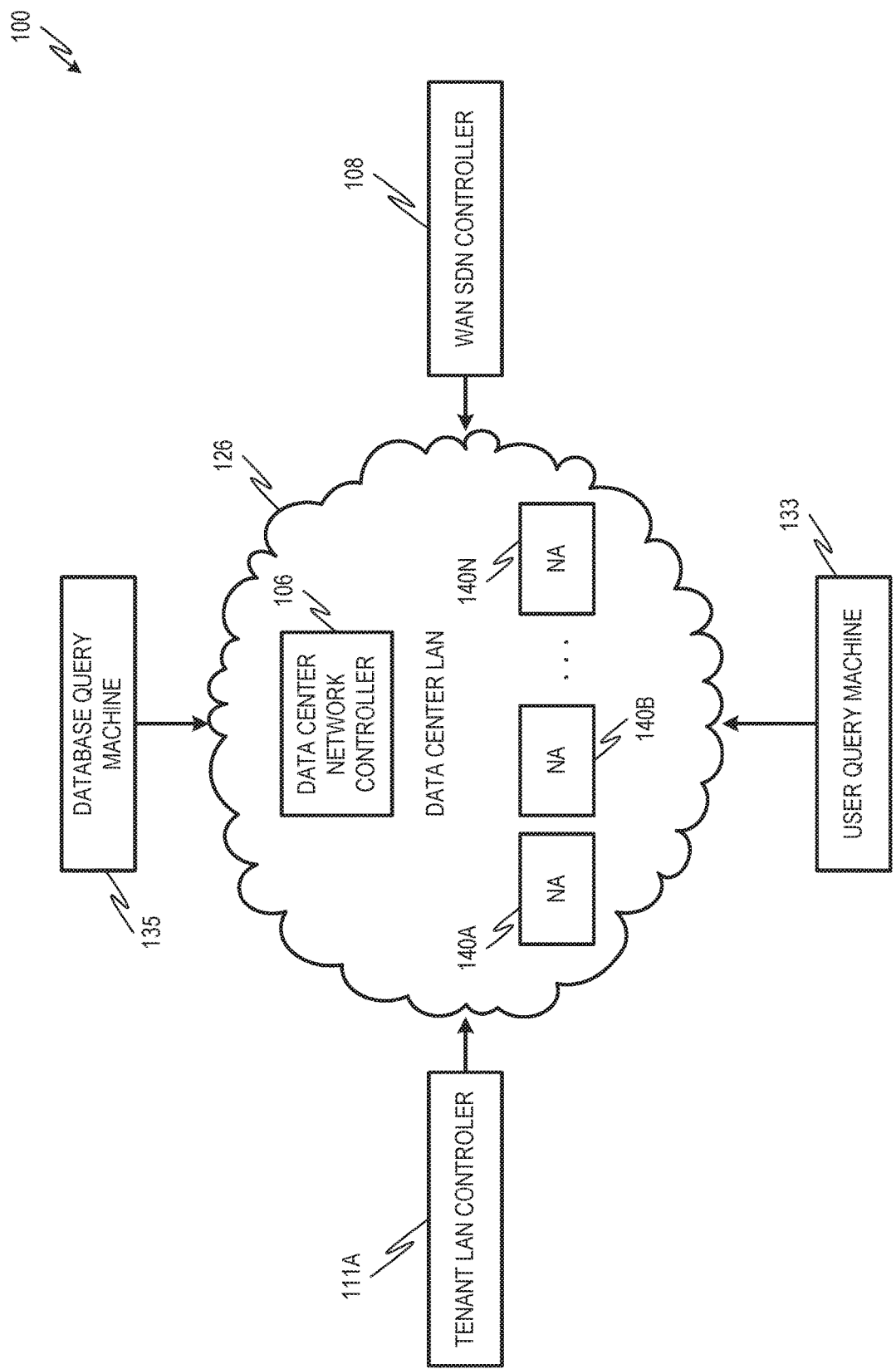
FIG. 2 is a diagram showing portions of the example environment of FIG. 1.

Networks 110A, 110B, 110N, 112, 126 may include various interconnected network appliances, described in more detail with respect to FIG. 2. The example of FIG. 1 shows network controllers 108, 106 that configure network appliances of the WAN 112 and data center network 126 to direct and prioritize the packets making up user queries 114A, 114B, 114N and user query responses 116A, 116B, 116N. In some examples, respective tenant LANs 110A, 110B, 110N may also include network controllers for directing and prioritizing packets making up user queries 114A, 114B, 114N and user query replies 116A, 116B, 116N (FIG. 2).

The data center network controller 106 may be configured to manage network appliances of the data center network 126 to facilitate efficient transmission of database queries 122A, 122B, 122N between the user query machine 133 and the database query machine 135. Similarly, the data center network controller 106 may be configured to manage network appliances of the data center network 126 to facilitate efficient transmission of database query responses 124A, 124B, 124N from the database query machine 135 to the user query machine 133.

FIG. 2 is a diagram showing portions of the example environment 100 of FIG. 1. The example of FIG. 2, an example tenant network controller 111A is shown. Although just one tenant network controller 111A is show, in some examples, each tenant network 110A, 110B, 110N includes a tenant network controller for directing and prioritizing packets making up user queries 114A, 114B, 114N and user query replies 116A, 116B, 116N (FIG. 2).

FIG. 2 also shows example network appliances 140A, 140B, 140N of the data center network 126. Although three example network appliances 140A, 140B, 140N are shown, any suitable number of network appliances can be included in the data center network 126. Network appliances 140A, 140B, 140N may be any suitable network hardware for processing packets, such as packets making up database queries 122A, 122B, 122N and database query responses 124A, 124B, 124N. For example, some or all of the network appliances 140A, 140B, 140N may be or include switches, routers, hubs, etc.

Network appliances 140A, 140B, 140N may accept flow entries from the respective network controllers 106, 108, 111A. A flow entry may include packet identification data and rule data. Packet identification data may identify a packet or type of packet and the rule data may describe how the network appliance 140A, 140B, 140N is to process the packet.

Example packet identification data may include, for example, a user identifier of the sender, an IP or other network address of the sender, a Media Access Control (MAC) address of the user computing device of the sender, a destination name, a destination IP or other network address, an IP or other address of the host or subnet from which the packet originated, a port number, a queue identifier, etc. In some examples, some or all of the packet identification data may be written to a header of the packet such that the network appliance 140A, 140B, 140N may determine whether any particular packet meets the packet identification data by comparing the packet identification data to the packet header.

Rule data may describe an action or actions that a network appliance 140A, 140B, 140N is to take with respect to a packet identified by packet identification data. Example actions include, sending the packet to another specified network appliance 140A, 140B, 140N, sending the packet to network controller (such as controllers 106, 108, 111A), adding the packet to a particular queue, queuing the packet, etc.

For example, a flow entry to a network appliance 140A, 140B, 140N may specify that all database query packets from queries of a particular type and/or from a particular tenant 101A, 101B, 101N are to be assigned to a particular queue. Another flow entry to a network appliance 140A, 140B, 140N may specify that all query packets assigned to a particular queue are to be routed to a specified other network appliance 140A, 140B, 140N. In some examples, flow entries for the network appliances 140A, 140B, 140N are configured according to a software defined network (SDN) protocol, such as OpenFlow protocol maintained by the OpenFlow Foundation.

Figure 3:
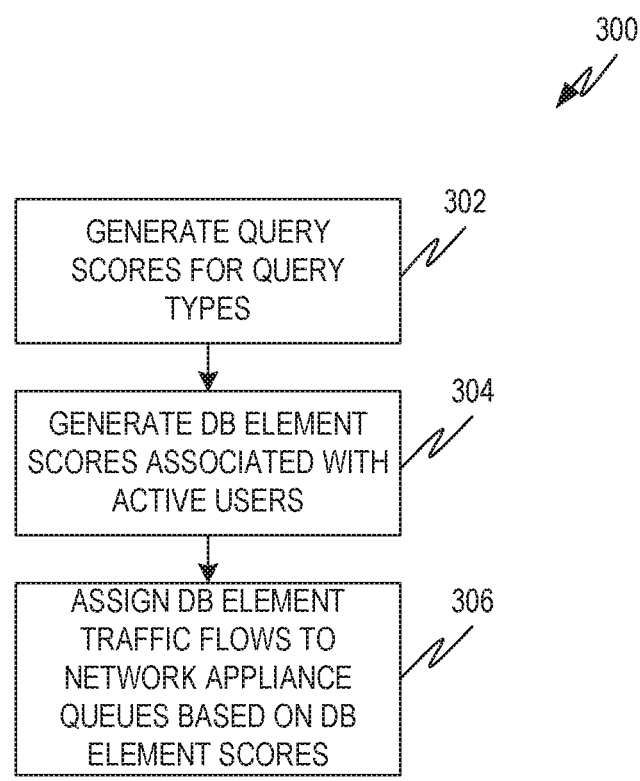
FIG. 3 is a flowchart showing one example of a process flow that can be executed by a data center network controller to implement virtualization for web application queries by optimizing the data center network for database queries.

FIG. 3 is a flowchart showing one example of a process flow 300 that can be executed by the data center network controller 106 to implement virtualization for web application queries by optimizing the data center network 126 for database queries 122A, 122B, 122N.

At operation 302, the data center network controller 106 generates query type scores for database query types that can be executed at the database 134. A query type is a type of query that can be executed at the database 134. In an example using SQL, one query type can include SELECT query directed to a particular table or other database element. The query type score for a query type can be based on database response times for the query type (e.g., how long it takes to execute queries of the particular type at the database 134).

In some examples, the data center network controller 106 executes, or causes to be executed at the database 134, a statistical data request instruction that returns response times for queries of a particular type or of different types. Examples of such instructions include statistical data (STAD) instructions available on some systems that utilize Advanced Business Application Programming (APAB) language, available from SAP SE of Waldorf, Germany. The user query machine 133 uses the query execution times to determine the scores for different query types. Further example details of how the user query machine 133 can determine query type scores are provided herein with reference to FIG. 4.

At operation 304, the data center network controller 106 generates database element scores for database elements associated with active users. The database element score for a database element can be based on the query type scores for query types that can be directed to the database element and, optionally, on a schema weight for the database element. In some examples, the schema weight for a database element is associated with a schema that includes the database element. Because schemas may be specific to a particular client, this can allow the data center network controller 106 to tailor the data center network by tenant. For example, the schema weights assigned to different schemas can allow the web application system 103 to provide different levels of web application service to different tenants 101A, 101B, 101N.

At operation 306, the data center network controller 106 assigns traffic flows between the user query machine 133 and the database query machine 135 to the network appliances 140A, 140B, 140N based on the database element scores for the traffic. For example, the data center network controller 106 can query the network appliances 140A, 140B, 140N to provide network appliance queue utilization data describing network appliances having underutilized queues. The data center network controller 106 can assign database element traffic flows to network appliance queues based on the database element scores. For example, traffic flows associated with database elements with scores indicating a higher priority can be assigned to underutilized or less utilized queues. Traffic flows associated with database elements with scores indicating a lower priority can be assigned to more utilized queues.

The data center network controller 106 can assign traffic flows by database element, for example, using Transmission Control (TCP) port designations. For example, the user query machine 133 may direct packets associated with a particular database query 122A, 122B, 122N to a TCP port that indicates the tenant 101A, 101B, 101N associated with the database query, a schema to which the database query 122A, 122B, 122N is directed, and/or a database element to which the database query 122A, 122B, 122N is directed. TABLE 1 below is an example, port-entity mapping table that can be used by the user query machine 133 to assign TCP ports to the packets associated with database queries 122A, 122B, 122N:

| Port Number | Tenant ID | DB-Schema | Element ID |
| --- | --- | --- | --- |
| | | | |

In the example of TABLE 1, each combination of a tenant 101A, 101B, 101N, a schema from the database 134, and an element from the database 134 is assigned to a particular TCP port.

The data center network controller 106 can be configured to provide rule data to the various network appliances 140A, 140B, 140N instructing the various network appliances 140A, 140B, 140N to assign packets having TCP ports corresponding to particular tenants, schemas, or database elements to a given queue.

Consider an example in which the database 134 has two schemas (e.g., for two tenants 101A, 101B, 101N). In this example, each of the schemas includes three database elements, such as tables. The user query machine 133 may generate a database query that is for schema 1, table 3. The user query machine 133 can be arranged to direct packets making up that database query to TCP port 10030, where 100 represents the schema and 30 represents an identifier for the table. The data center network controller 108 provides the various network appliances 140A, 140B, 140N with rule data instructing the various network appliances 140A, 140B, 140N on how to direct the packets. Example rule data describing the example above can instruct the network appliances 140A, 140B, 140N to:

(1) Modify a destination port of the packet to a destination port of the database query machine 135;
(2) Forward the packet to a physical trunk port of the network appliance 140A, 140B, 140N; and
(3) Assign the packet to an indicated queue.

Accordingly, in these examples, the TCP ports for packets generated by the user query machine 135 can indicate the database element, tenant, or schema associated with the corresponding database query 122A, 122B, 122N. Network appliances 140A, 140B, 140N can be configured by the data center network controller 106 with data instructing the network appliances 140A, 140B, 140N to modify the packet TCP port to one associated with the database query machine and assign the packet to a particular queue based on the original TCP port.

Figure 4:
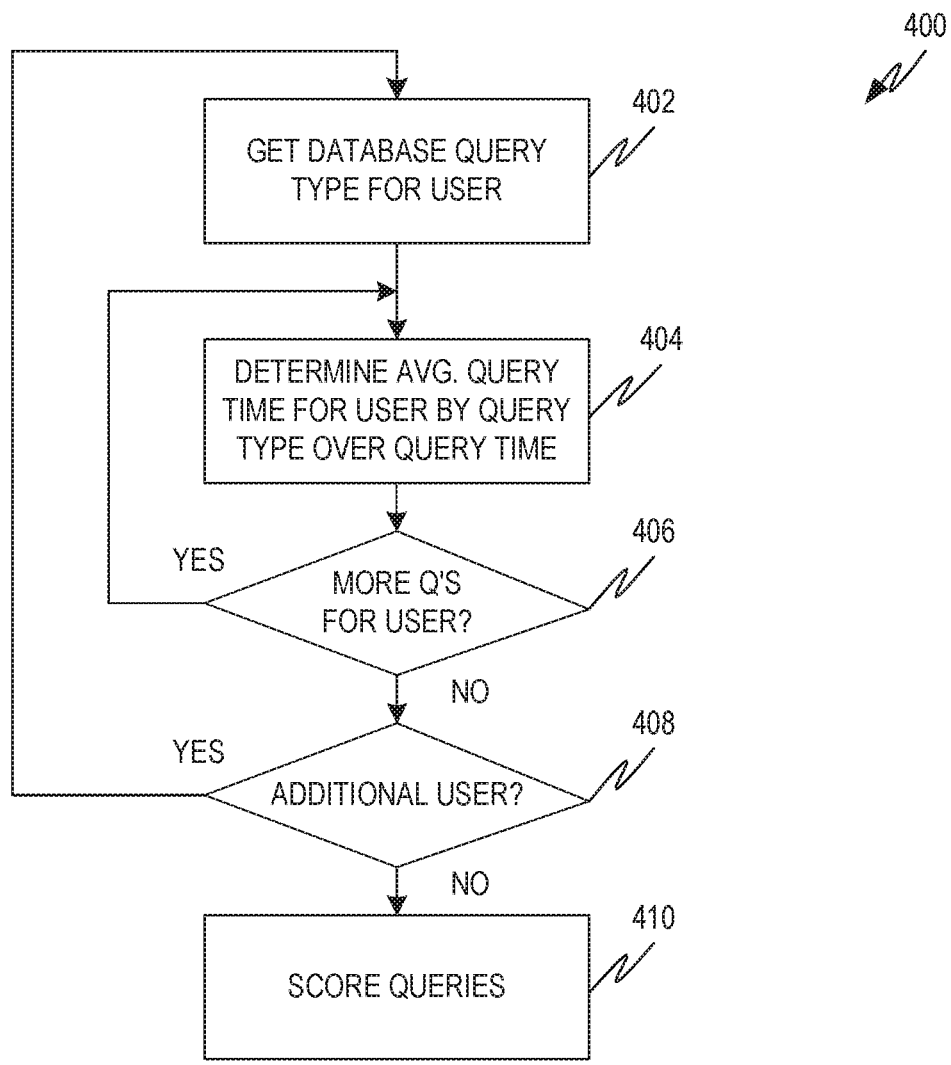
FIG. 4 is a flowchart showing one example of a process flow that can be executed by a data center network controller to generate scores for query types at the web application system.

FIG. 4 is a flowchart showing one example of a process flow 400 that can be executed by a data center network controller 106 to generate scores for query types at the web application system 103. The process flow 400 determines scores for database query types that are permitted for some or all of the users of the web application. Different users can have different permitted database query types. The database query types that are permitted to a particular user include the database query types that are generated by the user query machine 133 in response to the user query types that are permitted to be made by the user. Different users can be permitted to perform different user query types, for example, based on the tenant that the user is associated with, the user's level of permission, and/or other factors.

At operation 402, the data center network controller 106 gets the database query types that are permitted to a user. At operation 404, the data center network controller 106 determines an average query response time for a first database query type permitted to be made by the user The query response time for a database query type is the amount of time that it takes for the database query machine 135 to execute a query at the database 134. The average response time for a database query type is the average of response times for database queries of the database query type over a considered time period. The considered time period can be any suitable time period such as, for example, 8 hours, 1 day, 4 days, one week, etc. Determining the average database query response time for a query type can include executing the example STAD instruction: Get_Avg(Time_Th, SQL Query). The example STAD instruction returns the average database query response time (Time_Th) for queries of the type SQL Query.

At operation 406, the data center network controller 106 determines if there are any additional database query types permitted to be made by the user. If yes, the data center network controller 106 returns to operation 404 and determines the average database query response time for a next database query type permitted to be made by the user. If all database query types permitted to be made by the user have been considered, the data center network controller 106 determines, at operation 408, if there are additional users to be considered. If yes, the data center network controller 106 returns to operation 402 and gets the permitted database query types for the next user. In some examples, operations 402, 404, 406, and 408 consider all users who are permitted to query the web application. For example, at operation 408, the data center network controller 106 can proceed to operation 402 until all users permitted to query the web application are considered. In other examples, operations 402, 404, 406, and 408 consider all users who are active at a given time. For example, the data center network controller 106 can query the user query machine 133 to receive an indication of users who have made a user query within a threshold time. At operation 408, the data center network controller 106 can determine if all active users have been considered.

When all users (or all active users) have been considered, the data center network controller 106 scores the database query types at operation 410. The score for a query type can be based on the average response time for the database query type, determined at operation 404. In some examples, the score for a database query type is based on normalizing the average response time for the database query type by all of the query types considered by the process flow 400. For example, the average response time for the query type can be divided by the sum of the average response times over all considered query types, as indicated by Equation [1] below:

$$\text{SCORE}(\text{Query\_Type}_n) = \text{AVG\_RESP\_TIME}(\text{Query\_Type}_n) / \Sigma_0^i \text{AVG\_RESP\_TIME}(\text{Query\_Type}_i) \quad [1]$$

Figure 5:
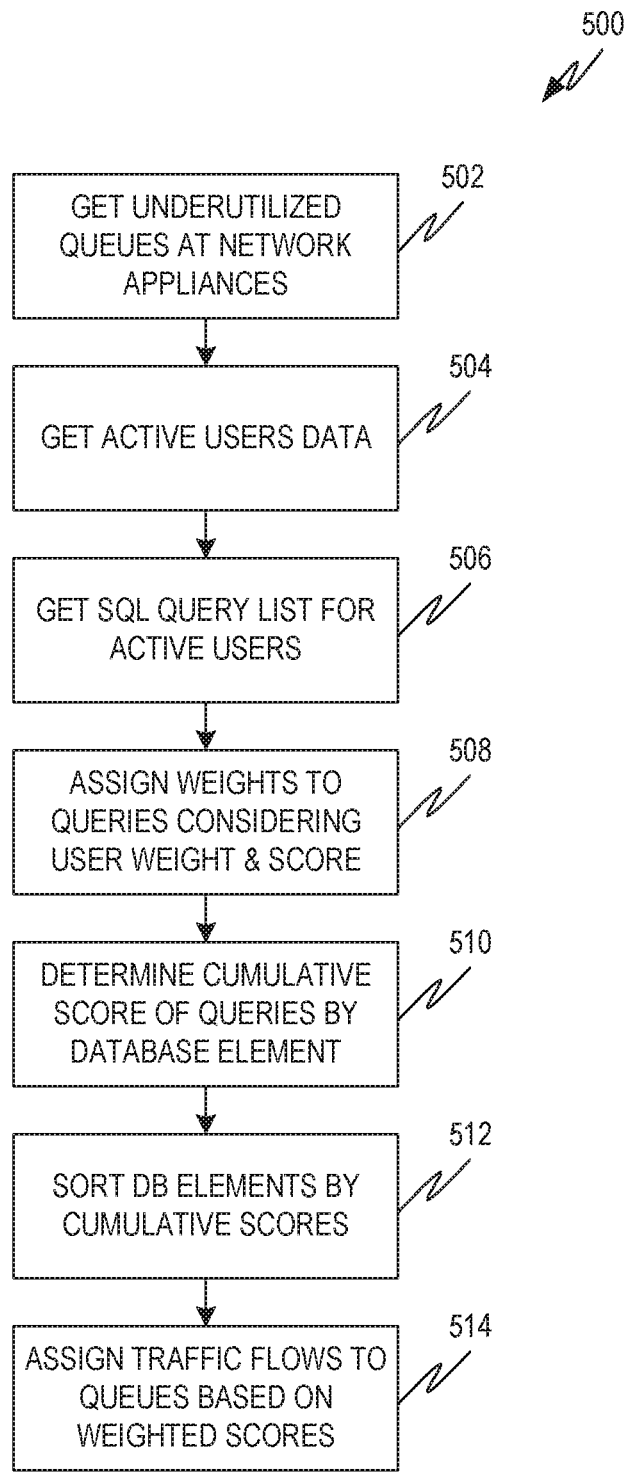
FIG. 5 is a flowchart showing one example of a process flow that can be executed by the process flow that can be executed by the data center network controller to manage the data center network based on query type scores.

FIG. 5 is a flowchart showing one example of a process flow 500 that can be executed by the process flow 500 that can be executed by the data center network controller 106 to manage the data center network 126 based on query type scores.

At operation 502, the data center network controller 106 queries network appliances 140A, 140B, 140N of the data center network 126 to receive indications of underutilized queues. At operation 504, the data center network controller 106 retrieves active users data describing users who are actively using the web application system 103. This can include, for example, users who have made a user query within a threshold time. This can include querying the user query machine 133 to provide data regarding users who have provided user queries within the threshold time (e.g., via user computing devices 104A-I).

At operation 506, the data center network controller 106 gets a database query list indicating database queries that are permitted to be made by the active users indicated at operation 504. This can also include querying the user query machine 133. For example, the user query machine 133 can provide the database queries that are generated in response to user queries permitted to be made by each user.

At operation 508, the data center network controller 106 scores the various database queries determined at 506 considering, for example, database query type scores for the queries. In some examples, scores for the database queries are also based on a schema weight associated with a tenant or schema associated with the database query, as described herein.

At operation 510, the data center network controller 106 determines a cumulative score of database queries by database element. For example, the scores of database queries directed to each relevant database element can be summed to generate the cumulative scores. At operation 512, the data center network controller 106 can sort database elements based on the scores. At operation 514, the data center network controller 106 can assign traffic flows to queues at the network appliances 140A, 140B, 140N based on the sorting at operation 512. For example, traffic flows (e.g., packets) associated with database elements having a high cumulative score can be assigned to less congested queues. Similarly, traffic flows associated with database elements having lower cumulative scores can be assigned to more congested queues.

In some examples, the data center network controller 106 also manages traffic flows for database query responses 124A, 124B, 124N between the database query machine 135 and the user query machine 133. In some examples, the amount of data or the number of packets included in a query response 124A, 124B, 124N is challenging to predict. For example, it may depend on data at the database 134. Accordingly, the data center network controller 106 can classify dataflows from particular tables or other database elements by comparing responses time for the dataflows to response times in a previous period. Dataflows from database elements for which response times have gone down are marked and assigned to less-congested queues.

Figure 6:
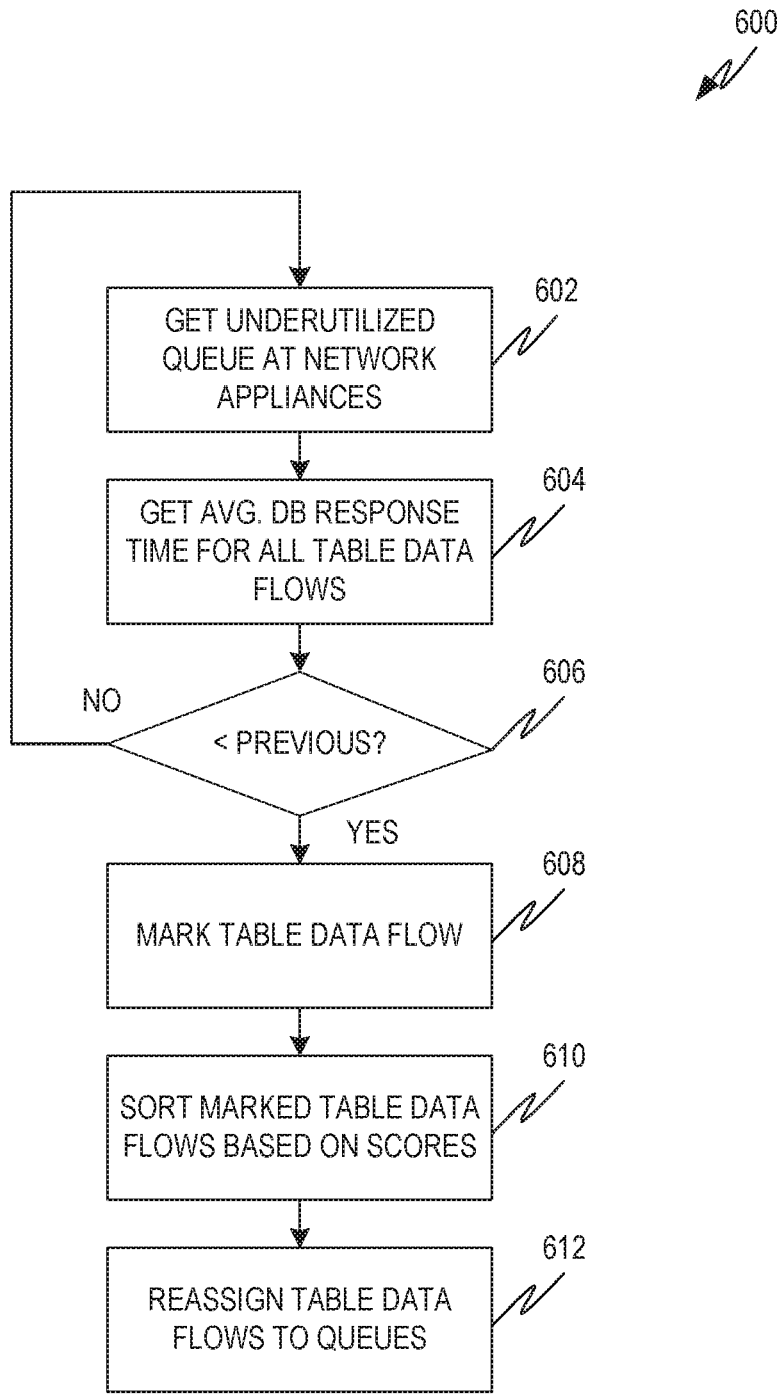
FIG. 6 is a flowchart showing one example of a process flow that can be executed by the data center network controller to manage traffic flows for database query responses between the database query machine and the user query machine.

FIG. 6 is a flowchart showing one example of a process flow 600 that can be executed by the data center network controller 106 to manage traffic flows for database query responses 124A, 124B, 124N between the database query machine 135 and the user query machine 133. At operation 602, the data center network controller 106 queries network appliances 140A, 140B, 140N of the data center network 126 to receive indications of underutilized queues.

At operation 604, the data center network controller 106 gets an average response time for table dataflows from the various tables at the database 134. A table dataflow includes packets from database query responses 124A, 124B, 124N from a particular table or other database element at the database 134.

The average response time for a table dataflow can be a weighted sum of average response times for the database queries directed to the table during a particular time period (e.g., one minute, one hour, one day, etc.). For example, the average response time of a table dataflow that, during the time period, receives database queries of a first type and database queries of a second type can be based on the average database query response time for the first query type and the average database query response time for the second query type. In some examples, the average database response time for the table dataflow can be weighted based on the proportion of queries directed to a particular table. For example, if 20% of the database queries directed to a table are of the first type and 80% of the queries to the table are of the second type, then the average database response time for the table dataflow corresponding to the table is 20% of the average database response time for the first query type plus 80% of the average database response time for the second query type.

At operation 606, the data center network controller 106 determines if the average response time for any table is less than it was in the previous time period. If no table dataflows have reduced table dataflow average response times, the process returns to operation 602. If any table dataflows have reduced average response times, those table dataflows are marked at operation 608.

At operation 610, the data center network controller 106 sorts table dataflows marked at operation 608 by score. For example, tables and other database entities can be scored as described herein with respect to FIG. 5. At operation 612, table dataflows associated with query responses 124A, 124B, 124N can be reassigned to queues at the network appliances based on the scores for the corresponding tables or other database elements. For example, if a particular marked table dataflow can be assigned to one of the under-utilized queues identified at operation 602. If the maximum data rate of a new queue is more than the maximum data rate of a previous queue, one or more of the table dataflows assigned to the new queue can be reassigned to another queue. The center network controller 106 can configure the network appliances 140A, 140B, 140N for traffic between the database query machine 135 and user query machine utilizing rule data, for example, as described with respect to FIG. 3.

Figure 7:
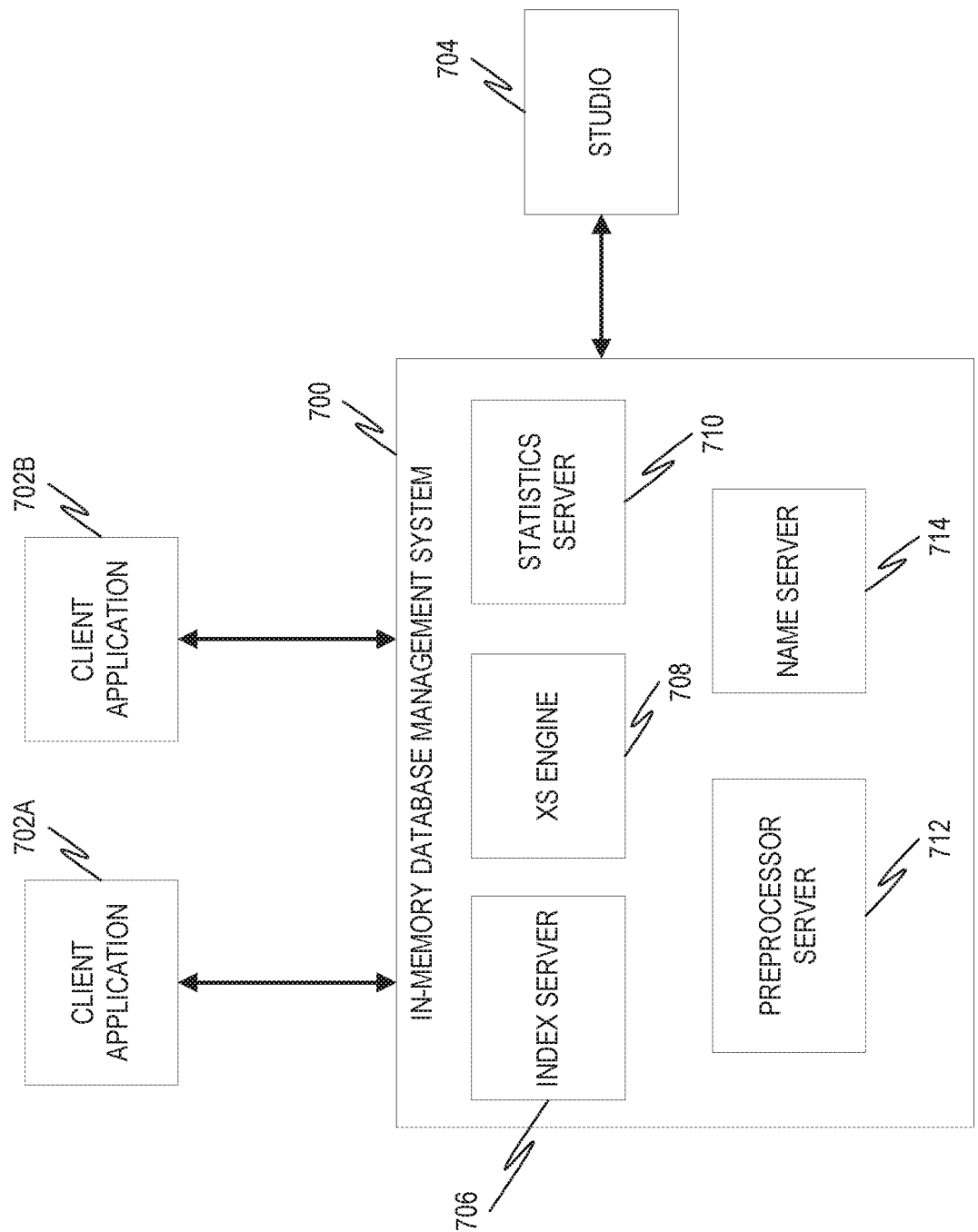
FIG. 7 is a diagram illustrating an example of an in-memory database management system that may be used to implement a web application in some examples of the network virtualization systems and methods described herein.

FIG. 7 is a diagram illustrating an example of an in-memory database management system 700 that may be used to implement a web application in some examples of the network virtualization systems and methods described herein. An in-memory database stores data primarily at main memory, such as a random access memory (RAM). This is different than databases that primarily employ a disk storage mechanism. In some examples, the database management system 700 may be or include an example of the HANA system from SAP SE of Walldorf, Germany. Although various features of web applications are described herein in the context of an in-memory database, network virtualization for web application queries may be generally performed for any type of web application using any suitable type of database.

The in-memory database management system 700 may be coupled to one or more client applications 702A, 702B. For example, client applications 702A, 702B may be examples of the web application described herein. Client applications 702A, 702B may execute one or more queries utilizing data from the database including, for example, presenting a user interface (UI) to one or more users, entering data, accessing data, etc. For example, client applications 702A, 702B can be executed at a web application system, similar to the web application system 103, that includes a user query machine and a database query machine. The client applications 702A, 702B may communicate with the in-memory database management system 700 through a number of different protocols, including Structured Query Language (SQL), Multi-dimensional Expressions (MDX), Hypertext Transfer Protocol (HTTP), Representational State Transfer (REST), Hypertext Markup Language (HTML).

FIG. 7 also shows a studio 704 that may be used to perform modeling by accessing the in-memory database management system 700. In some examples, the studio 704 may allow complex analysis to be performed on data drawn not only from real time event data and windows, but also from stored database information.

The in-memory database management system 700 may comprise a number of different components, including an index server 706, an XS engine 708, a statistics server 710, a preprocessor server 712, and a name server 714. These components may operate on a single computing device, or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine may be implemented as one or more Application Program Interfaces (APIs) and/or services positioned between the client applications 702A, 702B and the in-memory database management system 700. For example, the XS engine 708 may be configured to perform the functions of the privilege filter 118 for client requests received in languages other than SQL such as, for example, Multidimensional Expressions (MDX), Hypertext Transfer Protocol (HTTP), Representational State Transfer (REST), Hypertext Markup Language (HTML), etc.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
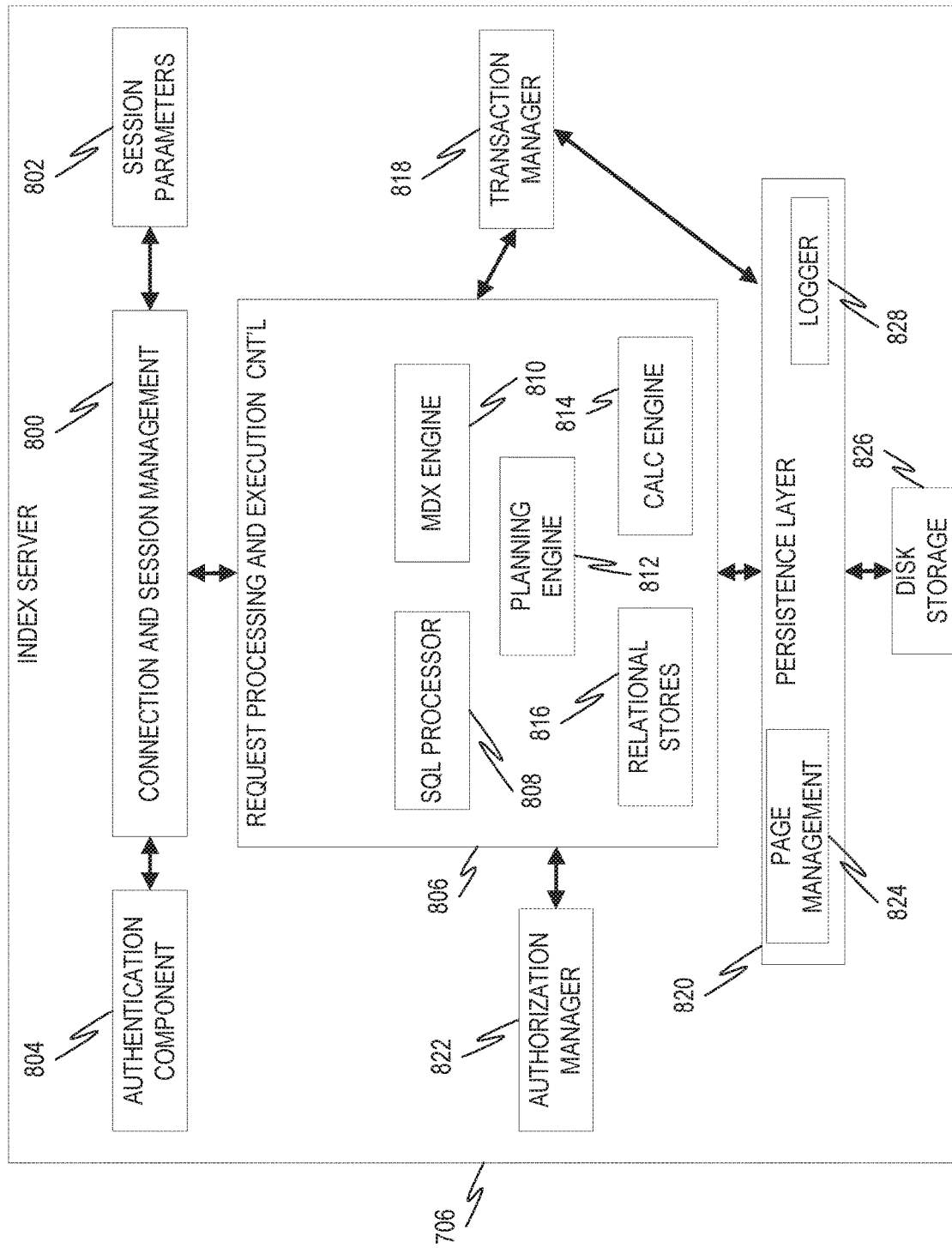
FIG. 8 is a diagram illustrating an example of the index server of FIG. 8.

The index server 706, in some examples, may house an instance of the privilege filter 118. The instance of the privilege filter 118 at the index server 706 may be in addition to or instead of the instance of the privilege filter 118 at the XS engine 708. FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g. client applications 702A, 702B). Once a session is established, clients can communicate with the database system using SQL statements. For each session, a set of session parameters 802 may be maintained, such as auto-commit, current transaction isolation level, etc. Users (e.g., system administrators, developers) may be authenticated by the database system itself (e.g., by logging in with log-in information such as a user name and password, using an authentication component 804) or authentication can be delegated to an external authentication provider such as a Lightweight Directory Access Protocol (LDAP) directory.

Client queries can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database system allows for the granting of privileges to users or roles. A privilege grants the right to perform a specified operation on a specified object.

The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
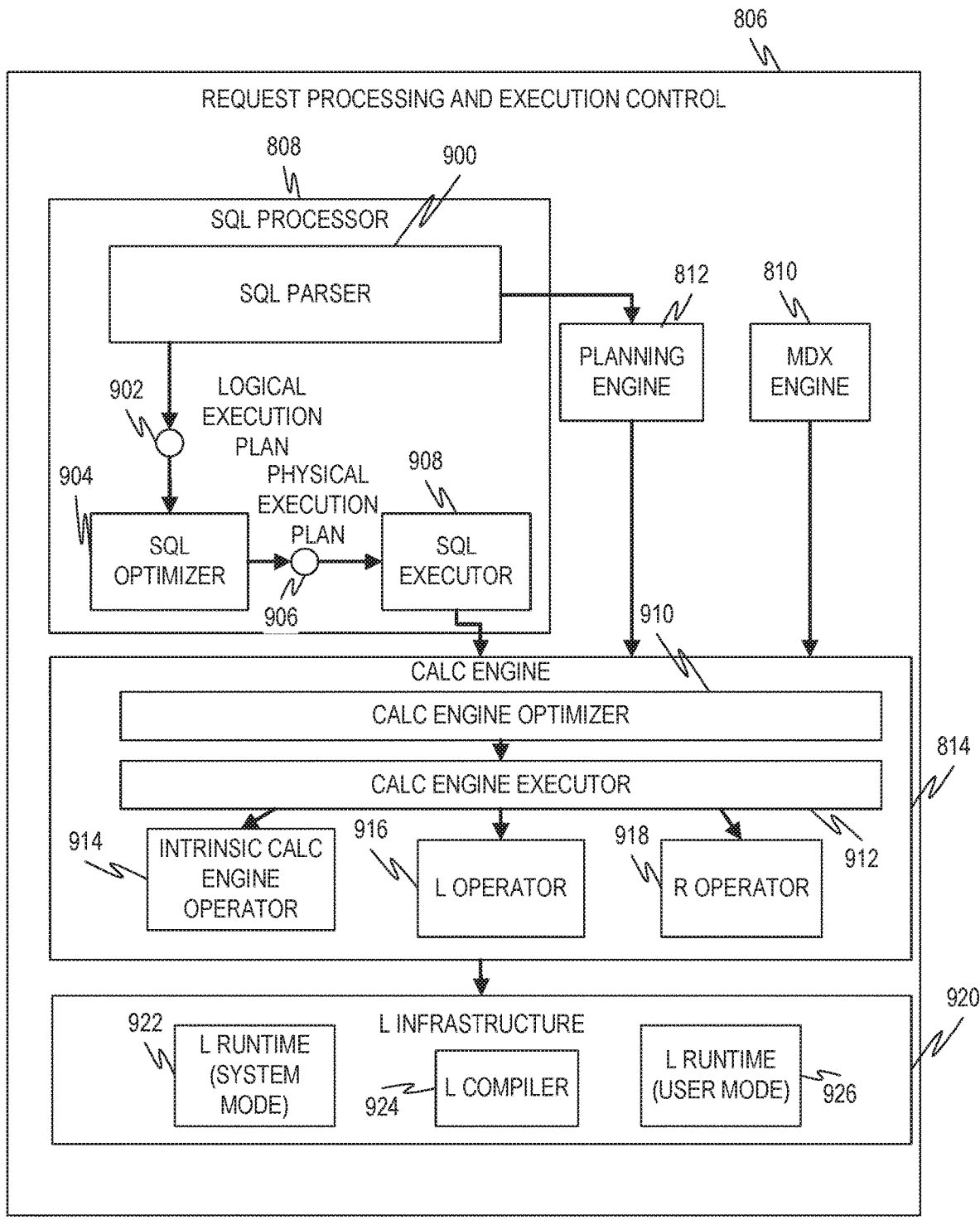
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (User mode) 926.

EXAMPLES

Example 1 is a system of managing network traffic between a user query machine and a database query machine, the system comprising: one or more processors; and a non-transitory machine-readable medium comprising instructions thereon that, when executed by the one or more processors, cause the one or more processors to perform operations comprising: generating a plurality of query type scores, a first query type score of the plurality of query type scores describing a first database query type directable from the user query machine to the database query machine; generating a first database element score for a first database element, the first database element score based at least in part on a set of the query type scores associated with database queries to be executed at the first database element, the first database element score also based at least in part on a first schema weight of a first schema associated with the first database element; and assigning a first database element traffic flow to a first network appliance queue based at least in part on the first database element score, the first database element traffic flow comprising a set of packets corresponding to queries from the user query machine to the database query machine.

In Example 2, the subject matter of Example 1 optionally includes the operations further comprising determining a first database response time associated with the first database query type, wherein the first database response time is based at least in part on an average time for the database query machine to respond to database queries of the first database query type from the user query machine.

In Example 3, the subject matter of any one or more of Examples 1-2 optionally includes wherein the first query type score is based at least in part on a first database response time associated with the first database query type and based at least in part on a plurality of database response times associated with a plurality of query types including the first database query type.

In Example 4, the subject matter of any one or more of Examples 1-3 optionally includes the operations further comprising receiving network appliance queue utilization data comprising a plurality of network appliance queues, the plurality of network appliance queues comprising the first network appliance queue, wherein the assigning of the first database element traffic flow is based at least in part on the network appliance queue utilization data.

In Example 5, the subject matter of any one or more of Examples 1-4 optionally includes wherein the first schema is also associated with a first tenant.

In Example 6, the subject matter of any one or more of Examples 1-5 optionally includes the operations further comprising: determining a first element dataflow response time metric describing a database response time for a set of queries directed to a first element over a first time period; determining that the first element dataflow response time is less than a previous first element dataflow response time over a prior time period before the first time period; and reassigning a first element response flow from a second network appliance queue to a third network appliance queue, wherein a maximum data rate of the third network appliance queue is greater than a maximum data rate of the second network appliance queue.

In Example 7, the subject matter of any one or more of Examples 1-6 optionally includes the operations further comprising: receiving, by a first network appliance, a first packet, wherein the first packet is part of a database query of the first database query type, the first packet indicating the first database element; and applying, by the first network appliance, a rule associated with the first database element to direct the first packet to the first network appliance queue.

In Example 8, the subject matter of Example 7 optionally includes wherein assigning the first database element traffic flow to the first network appliance queue comprises providing the rule to the first network appliance.

In Example 9, the subject matter of any one or more of Examples 7-8 optionally includes wherein the first packet comprises a first port entry indicating the first database element, and wherein applying the rule comprises modifying the first port entry to indicate a database port associated with the database query machine.

Example 10 is a method of managing network traffic between a user query machine and a database query machine, the method comprising: generating, by a data center network controller, a plurality of query type scores, a first query type score of the plurality of query type scores describing a first database query type directable from the user query machine to the database query machine; generating, by the data center network controller, a first database element score for a first database element, the first database element score based at least in part on a set of the query type scores associated with database queries to be executed at the first database element, the first database element score also based at least in part on a first schema weight of a first schema associated with the first database element; and assigning, by the data center network controller, a first database element traffic flow to a first network appliance queue based at least in part on the first database element score, the first database element traffic flow comprising a set of packets corresponding to queries from the user query machine to the database query machine.

In Example 11, the subject matter of Example 10 optionally includes determining a first database response time associated with the first database query type, wherein the first database response time is based at least in part on an average time for the database query machine to respond to database queries of the first database query type from the user query machine.

In Example 12, the subject matter of any one or more of Examples 10-11 optionally includes wherein the first query type score is based at least in part on a first database response time associated with the first database query type and based at least in part on a plurality of database response times associated with a plurality of query types including the first database query type.

In Example 13, the subject matter of any one or more of Examples 10-12 optionally includes receiving network appliance queue utilization data comprising a plurality of network appliance queues, the plurality of network appliance queues comprising the first network appliance queue, wherein the assigning of the first database element traffic flow is based at least in part on the network appliance queue utilization data.

In Example 14, the subject matter of any one or more of Examples 10-13 optionally includes wherein the first schema is also associated with a first tenant.

In Example 15, the subject matter of any one or more of Examples 10-14 optionally includes determining a first element dataflow response time metric describing a database response time for a set of queries directed to a first element over a first time period; determining that the first element dataflow response time is less than a previous first element dataflow response time over a prior time period before the first time period; and reassigning a first element response flow from a second network appliance queue to a third network appliance queue, wherein a maximum data rate of the third network appliance queue is greater than a maximum data rate of the second network appliance queue.

In Example 16, the subject matter of any one or more of Examples 10-15 optionally includes receiving, by a first network appliance, a first packet, wherein the first packet is part of a database query of the first database query type, the first packet indicating the first database element; and applying, by the first network appliance, a rule associated with the first database element to direct the first packet to the first network appliance queue.

In Example 17, the subject matter of Example 16 optionally includes wherein assigning the first database element traffic flow to the first network appliance queue comprises providing the rule to the first network appliance.

In Example 18, the subject matter of any one or more of Examples 16-17 optionally includes wherein the first packet comprises a first port entry indicating the first database element, and wherein applying the rule comprises modifying the first port entry to indicate a database port associated with the database query machine.

Example 19 is a non-transitory machine-readable medium comprising instructions thereon that, when executed by one or more processors, cause the one or more processors to perform operations comprising: generating a plurality of query type scores, a first query type score of the plurality of query type scores describing a first database query type directable from a user query machine to a database query machine; generating a first database element score for a first database element, the first database element score based at least in part on a set of the query type scores associated with database queries to be executed at the first database element, the first database element score also based at least in part on a first schema weight of a first schema associated with the first database element; and assigning a first database element traffic flow to a first network appliance queue based at least in part on the first database element score, the first database element traffic flow comprising a set of packets corresponding to queries from the user query machine to the database query machine.

In Example 20, the subject matter of Example 19 optionally includes the operations further comprising determining a first database response time associated with the first database query type, wherein the first database response time is based at least in part on an average time for the database query machine to respond to database queries of the first database query type from the user query machine.

Software Architecture

Figure 10:
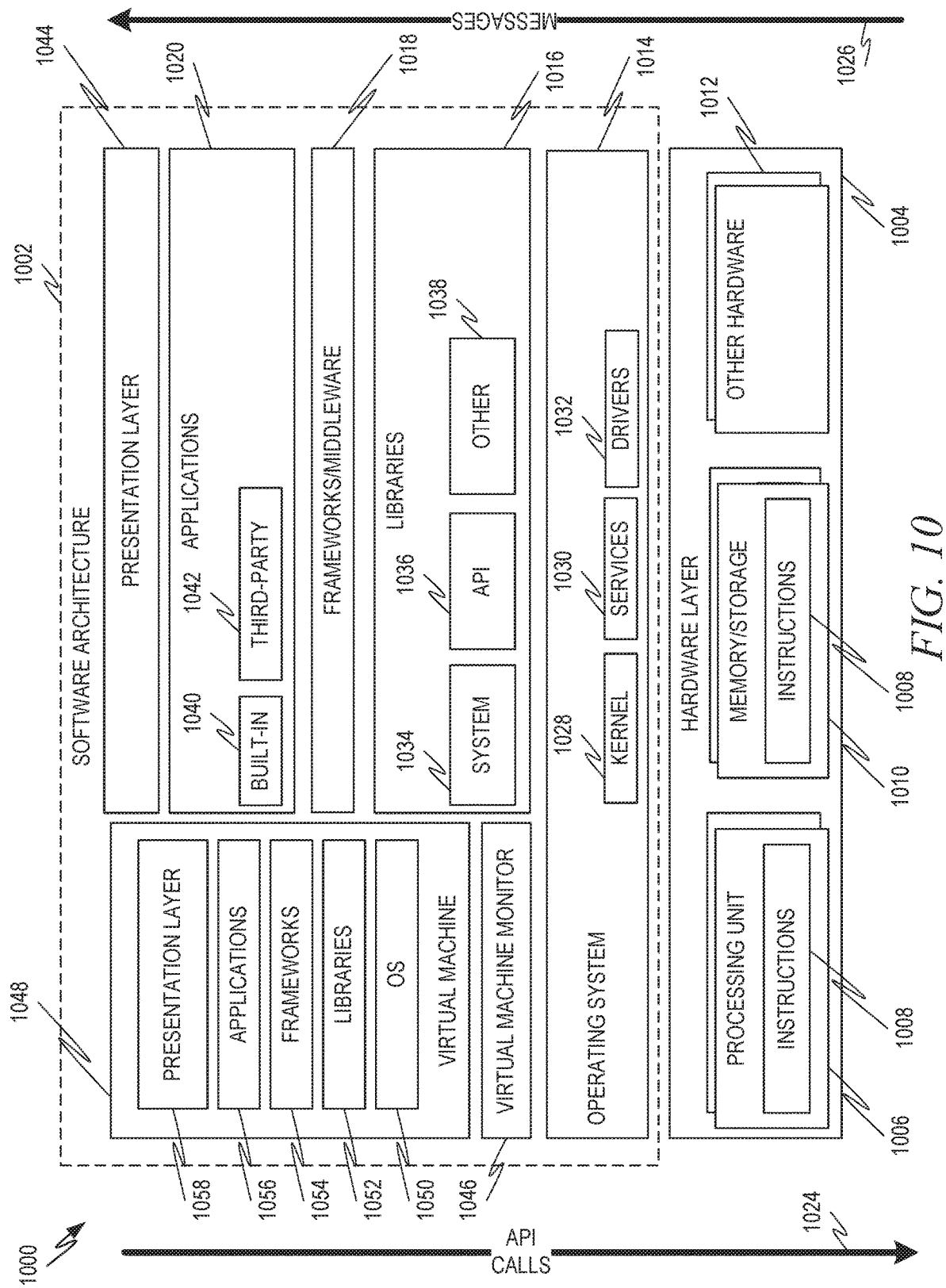
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules. In some examples, libraries 1038 may provide one or more APIs serviced by a message oriented middleware.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 includes built-in applications 1040 and/or third party applications 1042. Examples of representative built-in applications 1040 may include, but are not limited to, a contacts application, a browser application, a book reader application, a location application a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system 1034. APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
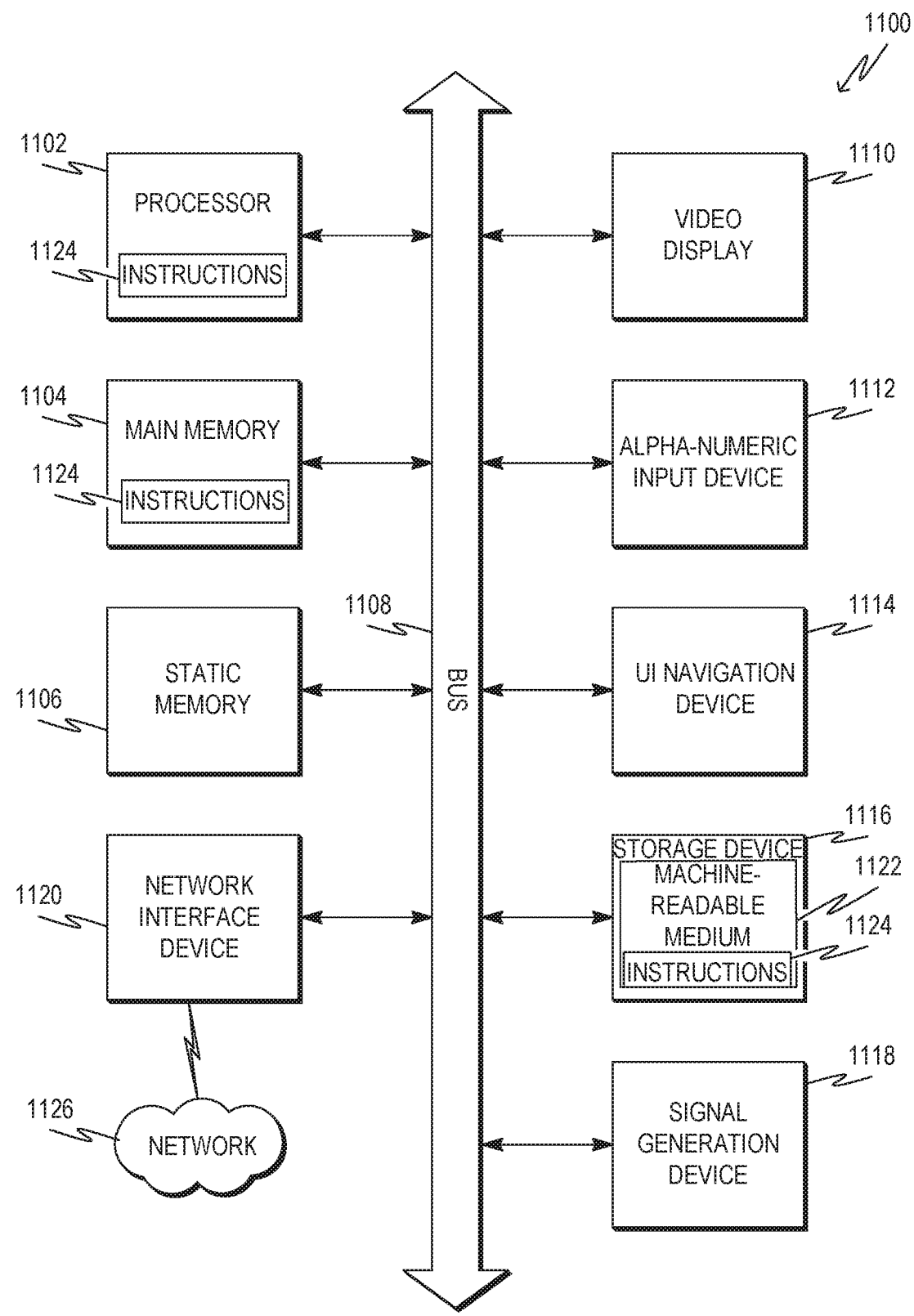
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of managing a web application, the system comprising:
 a user query machine configured to receive user queries directed to the user query machine through at least one web browser executing at a user computing device, the user query machine executing at a first hardware computing device;

a database query machine for running database queries corresponding to the user queries received by the user query machine, the database query machine executing at a second hardware computing device different than the first hardware computing device; and a data center network controller executing at a third hardware computing device, the data center network controller to manage network traffic between the user query machine and the database query machine, the data center network controller being programmed to perform operations comprising:

generating a plurality of query type scores, a first query type score of the plurality of query type scores describing a first database query type directable from the user query machine to the database query machine in response to at least one user query received by the user query machine from the at least one web browser, the first query type score being based at least in part on a first query type response time describing a length of time to execute queries of the first database query type;

generating a first database element score for a first database element, the first database element score based at least in part on a set of the plurality of query type scores associated with database queries to be executed at the first database element, the first database element score also based at least in part on a first schema weight of a first schema associated with the first database element; and configuring a first network appliance to assign a first database element traffic flow to a first network appliance queue of the first network appliance based at least in part on the first database element score, the first database element traffic flow comprising a set of packets corresponding to queries from the user query machine to the database query machine that are associated with the first database element.

2. The system of claim 1, the operations further comprising determining the first query type response time, the first query type response time being based at least in part on an average time for the database query machine to respond to database queries of the first database query type from the user query machine.

3. The system of claim 1, wherein the first query type score is also based at least in part on a second query type response time associated with a second query type directable from the user query machine to the database query machine.

4. The system of claim 1, the operations further comprising receiving network appliance queue utilization data comprising a plurality of network appliance queues, the plurality of network appliance queues comprising the first network appliance queue, wherein the assigning of the first database element traffic flow is based at least in part on the network appliance queue utilization data.

5. The system of claim 1, wherein the first schema is also associated with a first tenant.

6. The system of claim 1, the operations further comprising:

determining a database response time for a set of queries directed to a first element over a first time period;

determining that the database response time for the set of queries directed to the first element over the first time period is less than a database response time for a set of queries directed to the first element over a prior time period before the first time period; and reassigning a first element response flow from a second network appliance queue to a third network appliance queue, wherein a maximum data rate of the third network appliance queue is greater than a maximum data rate of the second network appliance queue.

7. The system of claim 1, the operations further comprising:

receiving, by a first network appliance, a first packet, wherein the first packet is part of a database query of the first database query type, the first packet indicating the first database element; and applying, by the first network appliance, a rule associated with the first database element to direct the first packet to the first network appliance queue.

8. The system of claim 7, wherein assigning the first database element traffic flow to the first network appliance queue comprises providing the rule to the first network appliance.

9. The system of claim 7, wherein the first packet comprises a first port entry indicating the first database element, and wherein applying the rule comprises modifying the first port entry to indicate a database port associated with the database query machine.

10. A method of managing a web application using a user query machine configured to receive user queries directed to the user query machine through at least one web browser executing at a user computing device; a database query machine for running database queries corresponding to the user queries received by the user query machine; and a data center network controller, the method comprising:

generating, by the data center network controller, a plurality of query type scores, a first query type score of the plurality of query type scores describing a first database query type directable from the user query machine to the database query machine in response to at least one user query received by the user query machine from the at least one web browser, the first query type score being based at least in part on a first query type response time describing a length of time to execute queries of the first database query type, the user query machine executing at a first hardware computing device, the database query machine executing at a second hardware computing device different than the first hardware computing device, and the data center network controller executing at a third hardware computing device;

generating, by the data center network controller, a first database element score for a first database element, the first database element score based at least in part on a set of the plurality of query type scores associated with database queries to be executed at the first database element, the first database element score also based at least in part on a first schema weight of a first schema associated with the first database element; and configuring, by the data center network controller, a first network appliance to assign a first database element traffic flow to a first network appliance queue of the first network appliance based at least in part on the first database element score, the first database element traffic flow comprising a set of packets corresponding to queries from the user query machine to the database query machine that are associated with the first database element.

11. The method of claim 10, further comprising determining the first query type response time, the first query type response time being based at least in part on an average time for the database query machine to respond to database queries of the first database query type from the user query machine.

12. The method of claim 10, wherein the first query type score is also based at least in part on a second query type response time associated with a second query type directable from the user query machine to the database query machine.

13. The method of claim 10, further comprising receiving network appliance queue utilization data comprising a plurality of network appliance queues, the plurality of network appliance queues comprising the first network appliance queue, wherein the assigning of the first database element traffic flow is based at least in part on the network appliance queue utilization data.

14. The method of claim 10, wherein the first schema is also associated with a first tenant.

15. The method of claim 10, further comprising:
determining a database response time for a set of queries directed to a first element over a first time period;
determining that the database response time for the set of queries directed to the first element over the first time period is less than a database response time for a set of queries directed to the first element over a prior time period before the first time period; and
reassigning a first element response flow from a second network appliance queue to a third network appliance queue, wherein a maximum data rate of the third network appliance queue is greater than a maximum data rate of the second network appliance queue.

16. The method of claim 10, further comprising:
receiving, by a first network appliance, a first packet, wherein the first packet is part of a database query of the first database query type, the first packet indicating the first database element; and
applying, by the first network appliance, a rule associated with the first database element to direct the first packet to the first network appliance queue.

17. The method of claim 16, wherein assigning the first database element traffic flow to the first network appliance queue comprises providing the rule to the first network appliance.

18. The method of claim 16, wherein the first packet comprises a first port entry indicating the first database element, and wherein applying the rule comprises modifying the first port entry to indicate a database port associated with the database query machine.

19. A non-transitory machine-readable medium comprising instructions thereon that, when executed by one or more processors, cause the one or more processors to perform operations comprising:
generating a plurality of query type scores, a first query type score of the plurality of query type scores describing a first database query type directable from a user query machine to a database query machine in response to at least one user query received by the user query machine from at least one web browser, the first query type score being based at least in part on a first query type response time describing a length of time to execute queries of the first database query type, the user query machine executing at a first hardware computing device and the database query machine executing at a second hardware computing device different than the first hardware computing device;
generating a first database element score for a first database element, the first database element score based at least in part on a set of the plurality of query type scores associated with database queries to be executed at the first database element, the first database element score also based at least in part on a first schema weight of a first schema associated with the first database element; and
configuring a first network appliance to assign a first database element traffic flow to a first network appliance queue of the first network appliance based at least in part on the first database element score, the first database element traffic flow comprising a set of packets corresponding to queries from the user query machine to the database query machine that are associated with the first database element.

20. The non-transitory machine-readable medium of claim 19, the operations further comprising determining the first query type response time, the first query type response time being based at least in part on an average time for the database query machine to respond to database queries of the first database query type from the user query machine.

21. The system of claim 1, the operations further comprising:
generating a second database element score for a second database element, the second database element score based at least in part on a set of the plurality of query type scores associated with database queries to be executed at the first database element and at least in part on a second schema weight of a second schema associated with the second database element; and
configuring the first network appliance to assign a second database element traffic flow to a second network appliance queue of the first network appliance based at least in part on the second database element score, the second database element traffic flow comprising a set of packets corresponding to queries associated with the second database element that are directed from a second user query machine to the database query machine.

22. The system of claim 21, wherein the first schema is associated with a first tenant and the second schema is associated with a second tenant different than the first tenant.

23. The method of claim 10, further comprising:
generating a second database element score for a second database element, the second database element score based at least in part on a set of the plurality of query type scores associated with database queries to be executed at the first database element and at least in part on a second schema weight of a second schema associated with the second database element; and
configuring the first network appliance to assign a second database element traffic flow to a second network appliance queue of the first network appliance based at least in part on the second database element score, the second database element traffic flow comprising a set of packets corresponding to queries associated with the second database element that are directed from a second user query machine to the database query machine.

24. The method of claim 23, wherein the first schema is associated with a first tenant and the second schema is associated with a second tenant different than the first tenant.

* * * * *